Sept. 7, 1948.                    C. W. MULLER                    2,448,544
                         AUTOMATIC SIMULATED TWO POINTER
Filed March 1, 1940        GLIDE PATH FOR GROUND TRAINING         4 Sheets-Sheet 1

INVENTOR
CARL W. MULLER
Edgar H. Snodgrass
BY Wade Koontz and
ATTORNEYS

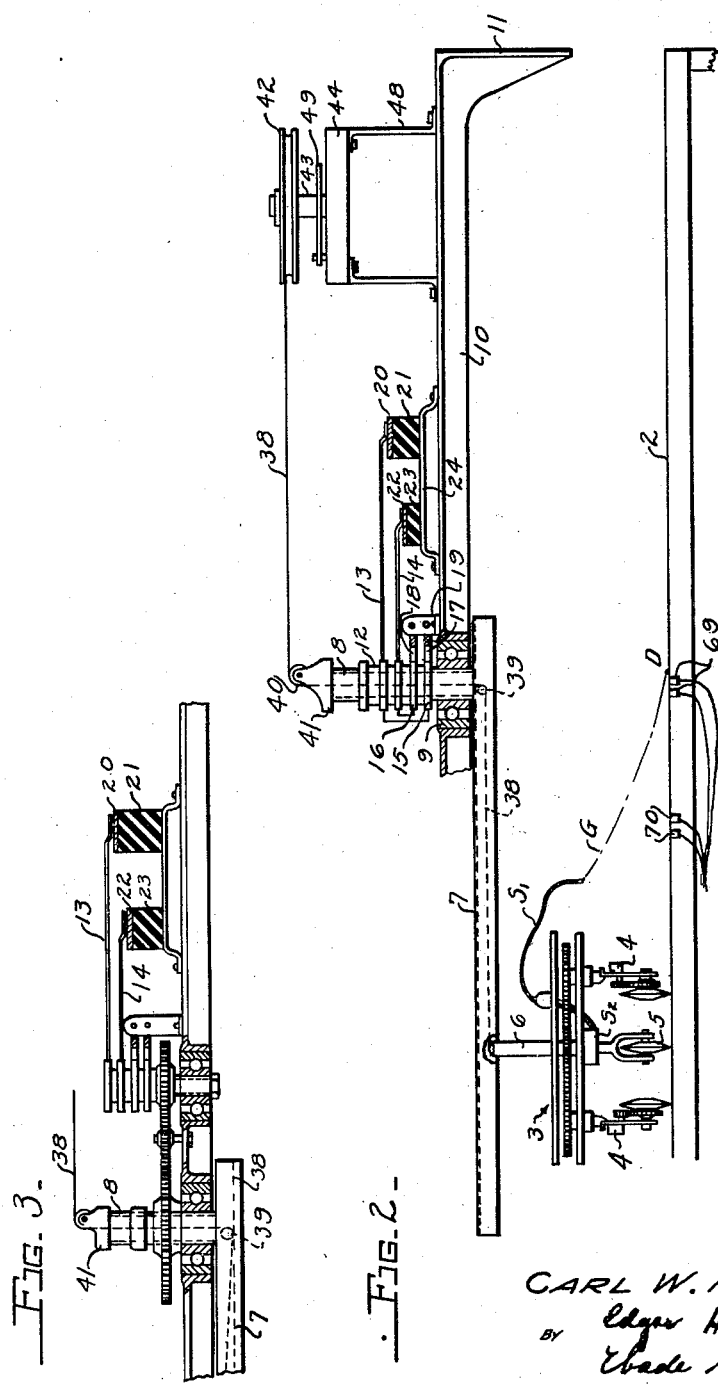

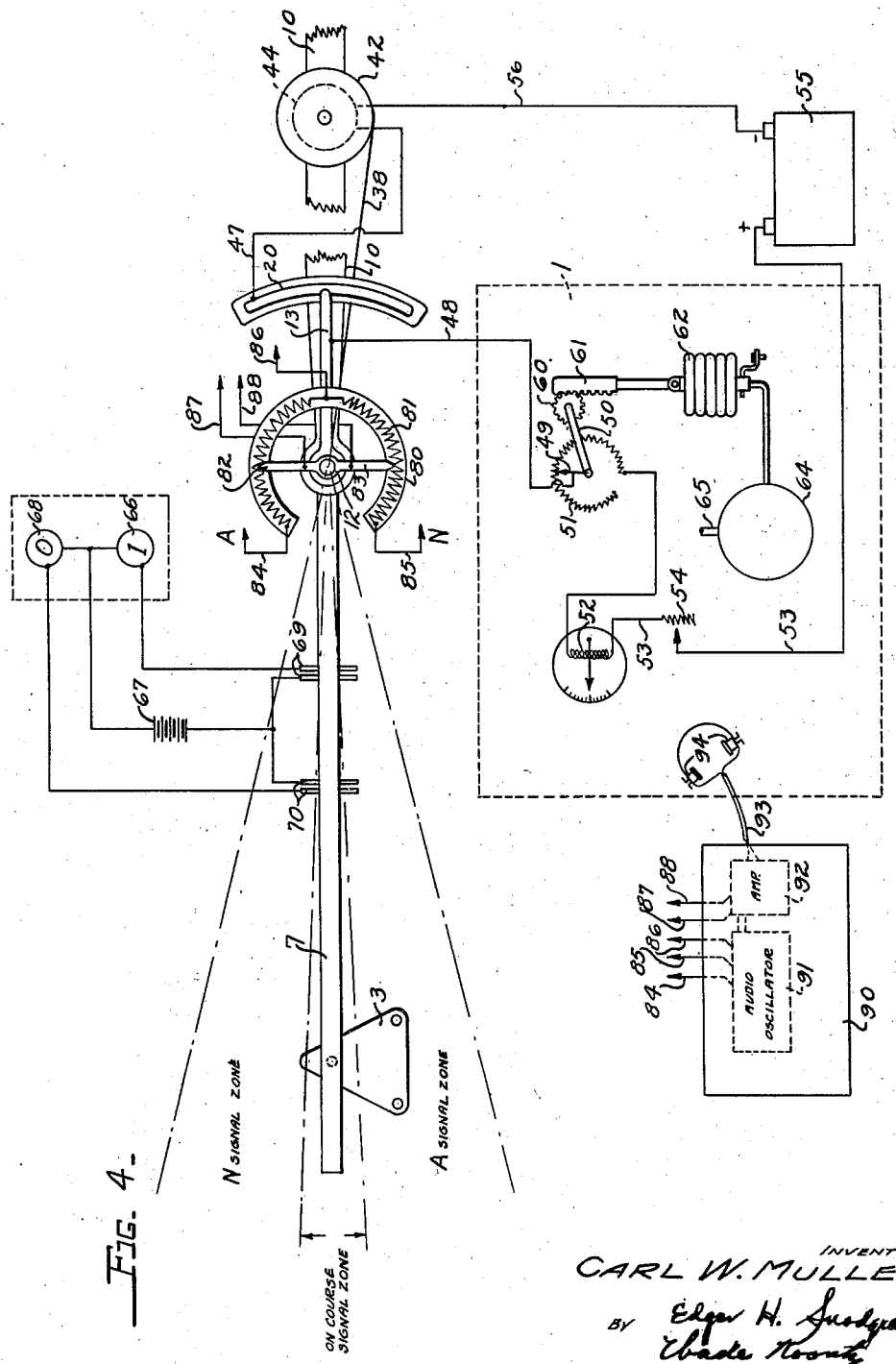

Sept. 7, 1948.   C. W. MULLER   2,448,544
AUTOMATIC SIMULATED TWO POINTER
GLIDE PATH FOR GROUND TRAINING Filed March 1, 1940   4 Sheets-Sheet 4

INVENTOR
CARL W. MULLER
BY
ATTORNEYS

Patented Sept. 7, 1948

2,448,544

UNITED STATES PATENT OFFICE 2,448,544

AUTOMATIC SIMULATED TWO POINTER GLIDE PATH FOR GROUND TRAINING

Carl W. Muller, Osborn, Ohio

Application March 1, 1940, Serial No. 321,727

3 Claims. (Cl. 35—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to auxiliary apparatus used in conjunction with aviation ground trainers and more particularly relates to a simple mechanical means for actuating visual or aural signalling systems in a manner such that a simulated blind landing along a predetermined simulated landing runway and predetermined simulated glide path may be accomplished.

Aviation ground trainers for instructing students in the art of blind flying are well known in the art. Such ground trainers generally comprise a grounded trainer tiltably mounted on a base and controllable by the occupant, in a manner similar to the control of an aircraft in flight and suitable instruments are provided to simulate the various flight attitudes assumed by the flight trainer. For a more complete description of one form of flight trainer reference may be had to United States Patents Nos. 1,825,462 and 2,009,857, granted to Edwin A. Link, Jr.

In conjunction with aviation ground trainers of the type above described, it is usual to employ a course recorder for tracing the simulated flight course, on a record sheet. The recorder generally comprises a frame movably supported on rollers so as to be capable of movement relative to the surface of the record map table. The rollers are steerable and are interconnected by gearing with a Selsyn receiver, electrically connected to a "Selsyn" transmitter, rotated by the trainer as it changes its azimuth heading. The arrangement is such that the recorder rollers are always controllably maintained with the same azimuth heading as the trainer. At least two of the rollers are provided with power driving means, such as small adjustable constant speed motors, so that the recorder may have a translatory motion over the record surface, at a velocity proportional to the simulated velocity of flight of the trainer. One of the rollers when inked, serves as a marking means. For a more complete and detailed description of one form of suitable recorder, reference may be had to United States Patent No. 2,179,663, granted to Edwin A. Link, Jr.

In giving instruction in blind instrument flying, the trainer and its course recorder are placed in operation and an instructor watches the course of the recorder relative to the chart on the record table on which the recorder marker wheel traces the recorder path. To simulate flying on a radio range, the instructor manually controls an electrical signalling system, so as to give the student the proper A, N or On course signal depending on the location of the recorder relative to the simulated radio range drawn on the record chart. As the recorder approaches the simulated radio transmitter station point, the instructor must also manually control the signal volume and cut off the signals completely, when the recorder is in the simulated zone of silence adjacent the radio range station point and then must give the proper signal and with the proper intensity, as the recorder emerges from the zone of silence. One form of such a signalling system is illustrated in United States Patent No. 2,119,083, granted to Edwin A. Link, Jr.

In order to simulate blind landings in accordance with the Bureau of Standards Blind Landing system, certain positional information must be transmitted to the student in the ground trainer, and to carry out the simulated landing properly, it is essential to know the position of the trainer as indicated by the course recorder relative to the desired landing runway in the horizontal plane, the simulated position of the trainer relative to an assumed glide path and the distance from the assumed landing field at predetermined points along the glide path, as determined by marker beacon simulating means.

In accordance with the invention, it is proposed to mechanically connect an electrical signalling means of either the aural or visual type to the recorder, in such a manner that departure of the recorder from a course representing the landing runway localizer beam will be correctly indicated in the trainer cockpit, either aurally or visually. The invention further proposes to use a simple indicating means controlled by the recorder in accordance with the simulated velocity of the trainer and controlled by the altitude simulating means of the trainer, to indicate the simulated position in a vertical plane, of the trainer, relative to a predetermined simulated glide path and further to employ an electrical signal system actuated by the recorder for simulating marker beacons indicating predetermined distances from the assumed point of landing.

The above named elements all cooperate to enable the student in the ground trainer to simulate a landing in accordance with the Bureau of Standards system without the intervention of any manual control by the instructor other than marking the position of the recorder marker wheel at the instant of the supposed landing and in certain instances also marking the positions of the recorder at points along the axis of the simulated landing runway corresponding to particular altitudes transmitted from the student to the instructor in a manner hereinafter more particularly described.

In my copending application No. 319,498, filed February 17, 1940, I have disclosed a means for mechanically actuating an electrical signalling system for automatically giving aural signals of a character and volume controlled by the position of the recorder on the record table and this application forms a continuation in part of the above identified application. Such application has matured into Patent No. 2,438,126, dated March 23, 1948.

It is an object of this invention to provide in an aviation ground training system a ground trainer controllable in a manner to simulate the flight of an aircraft, a course recorder directionally controlled by the ground trainer and movable relative to a record surface at a velocity proportional to the simulated flight velocity of the trainer, a signal system controlled by the course recorder to give an aural or visual signal of a character, dependent on the position of the course recorder on the record surface relative to a predetermined course on the record surface, a means to simulate the vertical descent of the trainer along a predetermined glide path in a vertical plane, parallel to the said predetermined course on said record surface and marker beacon simulating means actuated by the recorder for indicating predetermined positions of the course recorder along said predetermined course on said record surface.

It is a further object of the invention to provide a mechanical means, operated by an aviation ground trainer course indicator for actuating a visual indicator to indicate the departure of said course indicator in a horizontal plane from a predetermined course on a supporting reference surface.

A further object of the invention is the provision of a two pointer, visual, glide path indicating system for aviation ground trainers, in which the recorder mechanically controls the indication of said pointers.

A further object of the invention is the provision of a system for simulating descent of an aviation ground trainer along a predetermined glide path in which a glide path indicating system is rendered operative or inoperative in accordance with the simulated departure of the trainer from a predetermined course encompassed within the limits of an assumed landing runway localizer beam.

Other objects of the invention will become apparent by reference to the specification and the appended drawings forming a part thereof in which:

Fig. 2 is a side elevation partly in section of the mechanical indicator control means used in the system illustrated in Fig. 1;

Fig. 3 is a view showing a gearing detail for use in the device of Figs. 1 and 2; and Fig. 4 is a schematic illustration of a modified form of the system illustrated in Fig. 1 in which an aural signal means is incorporated.

The Bureau of Standards Blind Landing system comprises a radio transmitting station which radiates a radio signalling field formed by two directional overlapping signal fields, extending along the axis of the landing runway in such a manner that in a narrow zone aligned with the runway, a continuous On course signal will be heard, while if off course to either side of the zone, an A or N signal will be heard in the radio receiver tuned to the runway localizer beam frequency. Keyed I to T or other type signals may be used in place of the A and N signals. By keeping in the On course signal zone, the pilot knows that he is directionally aligned with the airport landing runway. The so called runway localizer beam is thus identical in function with the conventional radio range signal system and differs therefrom only in the number of On course, signal legs and in the width of the On course, signal zone. In addition to aural reception of signals, a visual indicator is also used, indicating by its deflection, whether the flight is On course or to the right or left of a course, aligned with the landing runway. A second radio transmitter transmits from a directional antenna, a signal field having an elliptical pattern in the vertical plane, aligned with the landing runway, the lines of constant signal strength forming one or more curved parabolic glide paths, intersecting the landing runway at a desired point thereon. A glide path receiver actuates an indicator having its pointer horizontal and intersecting the pointer of the runway localizer beam pointer. The glide path indicator indicates whether the aircraft is above or below the proper glide path. The combination of the two indicators serves to indicate the position of the aircraft, both with respect to the landing runway and the glide path and the pilot attempts to maintain the pointers intersecting at the center of the indicator dial. Marker beacon transmitters are arranged to indicate at least one fixed distance from the airport and to mark the field boundary and these transmitters radiate a signal field, in narrow vertical planes, affording additional positional information and serving as a check on the proper altitudes at the respective beacon points, since the glide path should intersect the outer marker beacon at a definite altitude.

Figure 1:
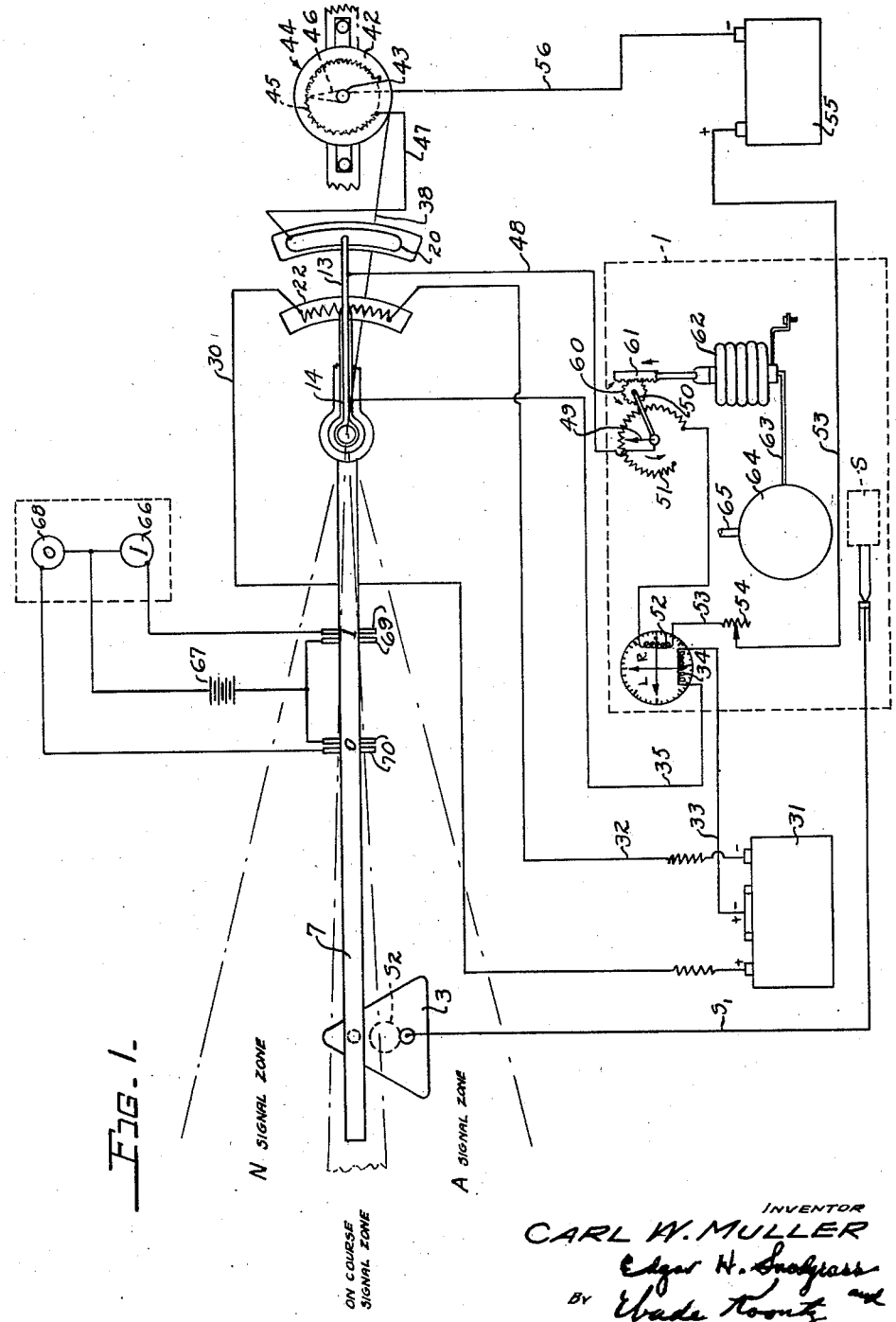
Fig. 1 illustrates schematically the essential apparatus and electrical circuits for forming a two pointer glide path indicating system to enable blind landings, in accordance with the Bureau of Standards Blind Landing system, to be simulated in an aviation ground trainer.

In accordance with the invention, the means to simulate the runway localizer beam indicating system, illustrated in Figs. 1 and 2, is as follows:

The aviation ground trainer generally indicated by the reference numeral 1 and shown in dotted lines is controllable in the manner above described and as it changes its azimuth heading, it rotates the rotor of the "Selsyn" transmitter S, which by conductors $S_1$, transmits an equal motion to the rotor of the "Selsyn" receiver $S_2$, which controls the azimuth heading of the course recorder 3, in its travel over the surface of the record table 2, in the manner above described. The field winding supply to the "Selsyn" transmitter and receiver units is not illustrated since this type of electrical motion transmission is well known in the art and needs no further comment. The recorder 3 is propelled by motors 4 over the record table 2 at a constant speed which may be adjusted to represent to some desired scale the simulated velocity in flight of the ground trainer 1 in the manner above described. The marker roller 5, when inked, serves to trace the course of the simulated flight of the trainer upon a suitable map or record sheet. The recorder 3 (Fig. 2) has a vertical stem 6 secured thereto in vertical alignment with the steering axis of the marker wheel 5. The stem 6 projects into the open side of a U-shaped channel member 7, parallel to the surface of the record table 2. The channel 7 is secured at its inner end to the lower end of a shaft 8, rotatably mounted in a ball bearing 9, suitably mounted in a boss at the outer end of a light metal frame 10, also arranged in parallel spaced relation with the surface of table 2. The frame 10 is rigidly mounted by the support 11 on any suitable structure (not shown) so that the frame 10 remains stationary. The shaft 8 is hollow and its axis intersects the surface of the table 2, at the point D, assumed to be the location of the runway localizer beam transmitting station. It will be seen that any rotation of the recorder 3 about the point D will cause rotation of the arm 7 and shaft 8.

A sleeve 12 of insulating material is secured to the shaft 8 and has contact arms 13 and 14 secured thereto in spaced relation and rotatable therewith. The contact arms 13 and 14 are each respectively electrically connected to slip rings 15 and 16, which in turn are respectively engaged by the brushes 17 and 18, which are fixed to an insulated mounting bracket 19 secured to frame 10. The contact arm 13 engages an arcuate metal contact 20, mounted on a block 21, of insulating material. The contact arm 14 engages an electrical resistance winding 22 of arcuate shape mounted on the insulating block 23. The blocks 21 and 23 are each secured to a bracket 24, mounted on frame 10.

As seen in Fig. 1, the resistance 22 is connected at one end by a conductor 30, to the positive terminal of a battery 31, of two or more cells connected in series. The other end of the resistance 22 is connected by conductor 32 to the negative terminal of the battery 31. A neutral conductor 33, connected between the positive and negative terminals of the battery, connects to one terminal of a zero center type galvanometer 34, the other terminal of which is connected by conductor 35, through the medium of brush 18 and slip ring 16 (Fig. 2) to contact arm 14. The contact arm 14 is axially aligned with the longitudinal axis of the channel member 7 and its relation to the resistance 22 is such, that when the channel member 7 is aligned with the axis of the On course signal zone of the localizer beam, schematically illustrated in Fig. 1, the contact arm 14 will be at the mid point of the resistance 22 and there will be a balance of resistance in each branch circuit from the battery 31 and the pointer of galvanometer 34 will remain in the zero position. By suitably arranging the polarity of the galvanometer 34, when the recorder 3 causes the arm 7 to rotate clockwise, as seen in Fig. 1, the current flow in conductor 33 will cause the pointer of galvanometer 34 to move toward the left, indicating that the recorder is off the runway localizer beam to the left and similarly counterclockwise rotation of channel member 7 will cause deflection of the galvanometer 34 to the right of the zero position. It is seen that movement of contact arm 14 in either direction from the center position on resistance 22 will cause an unbalance in resistance in the branch circuits and conductor 33 will carry a current in a direction and of a magnitude, depending on the magnitude and direction of movement of the contact arm 14 from the central position.

The zero center galvanometer 34 is mounted on the instrument board of the trainer 1 and so long as the simulated flight course of the trainer remains parallel with the simulated runway localizer beam drawn on the record surface, the recorder 3 will cause no rotation of the arm 7 about the axis of shaft 8 and the contact arm 14 will remain in the central position on resistance 22, causing the indicator 34 to read zero or On course. The recorder 3 is, however, free to move radially inward or outward with respect to the axis of rotation of shaft 51, since the stem 6 of the recorder 3 may slide in the channel 7. If the recorder 3 and the corresponding simulated trainer flight should vary, either to the right or left of the simulated runway localizer beam, On course position, the galvanometer will indicate the direction and approximate magnitude of such deviation, so that the student must execute a correcting control on the trainer to return to the proper course, aligned with the simulated landing runway.

The structure for indicating the position of the ground trainer in a simulated descent relative to an assumed glide path is as follows:

As seen in Fig. 2, the stem 6 of the recorder 3 projects within the channel member 7 and the stem 6 may move radially with respect to the axis of rotation of shaft 8. The stem 6 has connected thereto a small stranded flexible cable 38, which passes over a small guide roller 39, suitably mounted in jewelled bearings in the channel member 7. The cable 38 passes upward through the hollow shaft 8 and coaxial therewith over a small guide pulley 40, suitably pivotally mounted on a swivelled head 41, rotatably mounted relative to the shaft 8 by a suitable ball bearing. The cable 38 then wraps around a cable drum 42 and its terminal end is secured thereto. The cable drum 42 is secured to the vertical shaft 43 of a variable resistance unit 44 mounted by means of brackets 48 on the frame 10. A light hair spring 49 biases the shaft 43 and drum 42 to rotate in a counterclockwise direction to take up cable slack and to rotate the shaft 43, to thereby vary the resistance of unit 44. It is thus seen that the recorder in moving inward toward point D will create slack in cable 38, which will immediately cause hair spring 49 to rotate shaft 43, to take up the slack in the cable and to actuate the variable resistor unit 44. The rate of movement of the resistor control shaft 43 will be equal to the velocity of the recorder 3 and hence proportional to the simulated velocity of the trainer, as the recorder moves toward point D on the record table 2 in alignment with the simulated landing runway.

As seen in Fig. 1, the resistance unit 44 comprises a resistance winding 45, contact by the contact arm 46, rotatable with the shaft 43. The resistance winding 45 is connected by the conductor 47 to the contact strip 20, which in turn is engaged by the contact arm 13, rotatable with shaft 8 and aligned with the longitudinal axis of the channel member 7. The arm 13 is connected by means of slip ring 15, brush 17 (Fig. 2) and conductor 48, to the rotatable resistor contact arm 49, which contacts the resistance winding 51. The contact arm 49 is rotated by means of shaft 50. The resistance 51 is connected in series with a galvanometer 52 having a horizontal pointer and cooperating with a dial in common with the zero center galvanometer 34, the normal planes of the pointers being at right angles to each other. The galvanometer 52 is connected by means of a conductor 53 having an adjustable rheostat 54 inserted in series therewith to one terminal of a battery 55, the other terminal of which is connected by means of conductor 56 to the contact arm 46 of the resistor unit 44.

The shaft 50 of the resistor contact arm 49 has a pinion gear 60 mounted thereon and engaged by a rack 61, reciprocable by means of a metallic bellows 62, connected by a conduit 63 to a tank 64 forming a part of the altitude simulating means in the trainer. The tank 64 is adapted to be evacuated by a pump controlled by the climbing attitude of the trainer and the simulated throttle setting so that the pressure within the tank simulates the changing atmospheric pressure during a climb and its final pressure corresponding to an assumed altitude, a conduit 65 connects to an altimeter on the trainer instrument board to indicate the instant simulated altitude and a rate of climb indicator may be similarly connected to the tank. When the trainer is placed in a descending attitude, the pressure is gradually restored to atmospheric pressure. The means for evacuating the tank, the control means and the altimeter have not been illustrated in the drawings since they are well known in the art and form a part of the standard equipment of trainers of the "Link" type above noted.

The operation of the device is as follows: As the recorder 3 approaches the assumed airport D (Fig. 2) along the course of the runway localizer beam, the resistance of unit 44 will be decreased at a rate proportional to the simulated velocity of the trainer, while the pressure responsive device 62 will cause the resistance 51 to be increased at a rate equal to the simulated rate of descent of the trainer, since as the pressure in the tank 64 returns toward atmospheric pressure, simulating descent of an aircraft, the bellows 62 will expand and move upward, causing resistor arm 49 to move in the resistance increasing direction. By adjusting resistance 54 above a predetermined altitude, a certain minimum value of the resistance 51 will be introduced in series with the resistance of unit 44, galvanometer 52 and battery 55. A current will flow such that the galvanometer pointer will be in the middle of its scale, which is the zero position. If now it is assumed that the trainer descends for a simulated landing along the simulated glide path beam, indicator 52 will remain in the zero position as long as the resistance 45 and resistance 51 are inversely varied in equal amounts, but if the rate of descent is too great, the resistance 51 in series with the battery 55 will increase an amount which will increase the total resistance in the circuit and the current will accordingly decrease causing the pointer of galvanometer 52 to drop, indicating that the simulated position of the trainer is below the simulated glide path. In a similar manner if the rate of descent is not sufficient, the total resistance in series with the battery 55 and galvanometer 52 will be decreased and the current will increase, causing the pointer of galvanometer 52 to move up from the neutral position to indicate that the simulated position of the trainer is above the simulated glide path. The student endeavors to maintain the pointers of galvanometer 34 and galvanometer 52 intersecting at the middle of the dial and the shift of the point of intersection indicates, for example, that the simulated flight is to the right of the landing runway and above the glide path, when the point of intersection is in the upper right hand quadrant of the dial and corresponding indications are given in the other quadrants. The glide path can thus be followed and the landing may be assumed to be accomplished when the altimeter reads zero, or if desired, a signal lamp may be flashed or the trainer power supply cut off when the altimeter is in the zero position to indicate simulated contact with the ground.

The effect of a curved glide path is obtained by varying the value of the units of resistance per unit of angular deflection of either one or both of resistance windings 45 and 51, and this variation may be logarithmic or otherwise to imitate as nearly as desired the actual glide path in use in various blind landing systems. Where the curved landing beam is to be simulated, the student must continually change the rate of descent to stay on the simulated landing beam. One type of landing beam glide path is illustrated at G, in Fig. 2.

In order to simulate the marker beacons in use with the Bureau of Standards and other blind landing systems, as seen in Figs. 1 and 2, the invention utilizes two pairs of closey spaced metal bars or contacts 69 and 70 respectively, imbedded in the surface of the record table 2 at spaced points along the axis of the landing runway and spaced at scale distances representing the field boundary and a distance of two miles or other desired value from the field boundary, measured from point D, the assumed localizer beam and glide path beam transmitter station points, on the record surface. The metal bars 69 represent the field boundary marker beacon transmitter station point, indicated by the point I and the metal bars 70 represent the outer marker beacon station indicated as O. The metal bars 69 are connected in series with a signal lamp 66 and a battery 67, so that when the metal recorder marker wheel passes over the bars it will complete the circuit to lamp 66. The metal bars 70 similarly are arranged in a series circuit with a signal lamp 68 and battery 67, so that when the metal recorder marker wheel passes over bars 70, it will complete the circuit to lamp 68 and the light will indicate the position of the recorder at the outer station O. Simple contact switches may be used in place of the bars 69 and 70. The student in making the simulated trainer landing is apprised of a known simulated distance from the field when the recorder flashes the outer beacon signal lamp 68 in the trainer cockpit and he should then, if not on the glide path beam, intersect the same at a predetermined simulated altitude of say, eight hundred feet. Assuming the descent is being made along the glide path beam, when the recorder flashes the inner field boundary marker beacon lamp 66 in the trainer cockpit, the student must then close the throttle shortly thereafter, in order to simulate a proper landing.

In the device of Figs. 1 and 2, if the recorder is in a position to the right or left of the range of the localizer beam zone, the resistor arm 14 will move out of contact with the resistance 22 and the contact arm 13 will move out of contact with the contact strip 20, so that both the localizer beam indicator and the glide path indicator 52 will be rendered inoperative.

Fig. 3 illustrates a gear transmission for actuating the sleeve 12 of the device of Figs. 1 and 2, in order to obtain a greater angular movement of the contact arms 13 and 14, enabling a longer resistance winding 22 to be employed so that a more sensitive indication may be obtained.

Fig. 4 illustrates a modification of the system illustrated in Fig. 1 in which the visual runway localizer beam indicator is replaced by an aural signal system giving positional information relative to the location of the course recorder with reference to the landing runway course on the record table and serving the same function as the visual indicator 34 of the device of Figs. 1 and 2. The system schematically illustrated in Fig. 4 is otherwise identical with the structure illustrated in Figs. 1 and 2 and similar parts are given the same reference numerals.

The resistance 22 of the device of Figs. 1 and 2 is replaced by a potentiometer generally indicated by the numeral 80, having a resistance winding 81 rigidly mounted on the frame 10 and contacted by the contact arms 82 and 83 respectively, which are insulated from each other and mounted on the sleeve 12, rotated by shaft 8 and channel member 7. The resistor contact arms 82 and 83 are aligned and in a plane perpendicular to the longitudinal axis of the channel member 7. One terminal of the potentiometer winding 81 is connected by means of a conductor 84 to a signal generator 90. The other terminal of the potentiometer winding is connected by the conductor 85 to the signal generator 90. The center of the potentiometer winding 81 is connected to the signal generator 90 by a conductor 86. The contact arm 82 is connected to the signal generator 90 by means of a conductor 87 and the contact arm 83 is similarly connected to the signal generator by means of a conductor 88.

The signal generator 90 is of well-known construction and employed to generate radio range signals in a manually controlled signal system in use with aviation ground trainers and its specific construction is well known in the art. The signal generator has an audio oscillator indicated by numeral 91, which is alternately keyed mechanically to generate the well known A and N signals employed in radio range beacons. The A signal output of the oscillator is conducted by lead 84 to the potentiometer 80 and the N signal output of the oscillator is conducted by lead 85 to the potentiometer 80. The lead 86 forms a return in the oscillator circuit. The lead 87, connected to the resistor arm 82, conducts the A signal to a power amplifier tubes in the amplifier unit 92 of the signal generator 90 and the lead 88 conducts the N signal to a similar power amplifier tube in the amplifier unit 92 of the signal generator 90. The output of the amplifier unit 92 is led by conductors 93 to headphones 94 in the cockpit of the trainer 1.

In the position of the parts as seen in Fig. 4, an equal amount of resistance is inserted in each amplifier circuit and the A and N signals will be heard in succession with equal intensity, so that in effect, a continuous audible tone will be heard in the headphones 94, while if the recorder causes clockwise rotation of the arm 7 into the N signal zone, the resistance contact arm 82 is rotated to increase the resistance in the A signal circuit of the amplifier 92, while resistance contact arm 83 is rotated to decrease the resistance in the N signal circuit of the amplifier 92. The N signal will then predominate, while the A signal will be suppressed into the background. If the recorder 3 rotates channel member 7 in a counterclockwise direction into the A signal zone, the potentiometer 80 will be adjusted in the opposite sense and the A signal will predominate, while the N signal will be suppressed into the background. As long as the recorder in its travel over the record table 2 causes no rotation of the channel member 7 out of the On course signal zone, the continuous On course signal will be heard and the student will know that he is simulating flight along the simulated runway localizer beam. The signals generated by the signal generator 90 cooperate with the glide path indicator and marker beacon simulating means to effect a simulated blind landing in the same manner as above described with reference to the device of Figs. 1 and 2.

Figure 5:
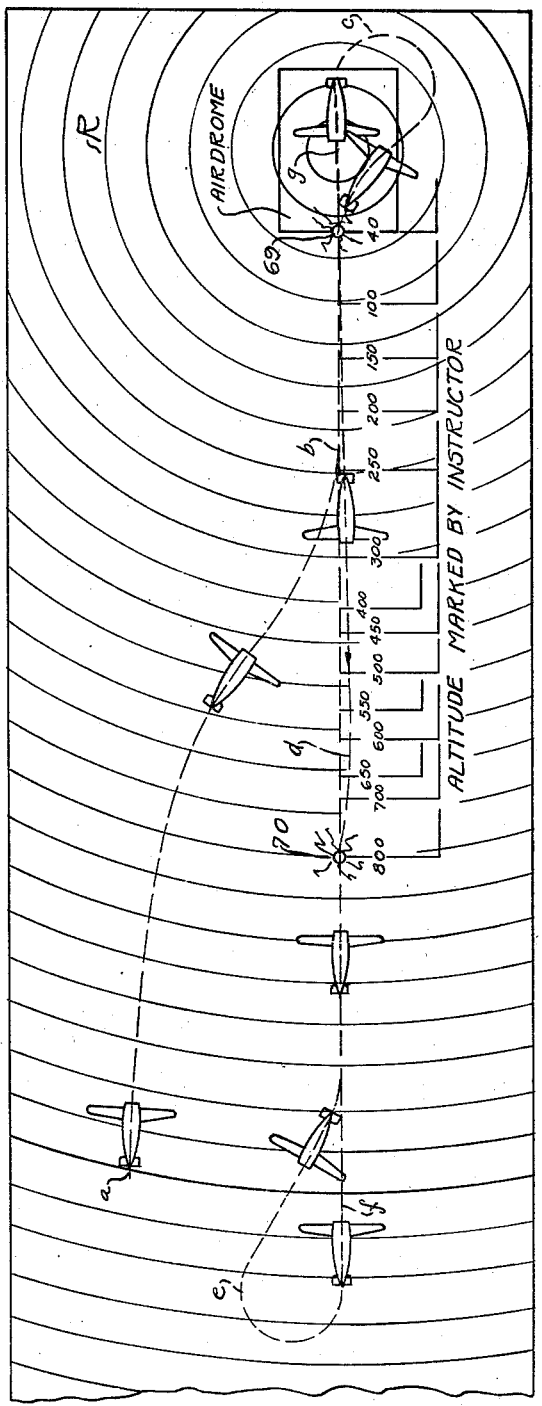
Fig. 5 illustrates the trace left by the course indicator on a record sheet after making an instrument landing employing the device of Fig. 1 or Fig. 4.

Fig. 5 illustrates the ground track trace made by the recorder 3 on a record chart in making a simulated instrument landing, using the device of Fig. 1 and Fig. 4. The chart placed on the record table 2 is indicated by the reference character R and is of a predetermined character such that the distance of about seven-eighths of an inch between the concentric circles marked thereon represents a distance of a half mile for a recorder speed representing a scale speed of the trainer of one hundred twenty miles per hour. The recorder speed employed is preferably about four times the speed usually employed in orientation problems, in order to open up the problem and give a reasonable distance between the marker beacon station 69 and 70. The record sheet R has an airport landing runway marked thereon in alignment with the marker beacon signal switches 69 and 70, and small openings are cut in the record chart to allow the marker wheel to come in contact with the switch bars 69 and 70.

Assuming that the course indicator 3 is initially at some point $a$, located out of the localizer beam signal zone, and that the direction of the landing field is approximately known to the student in the trainer, the student may begin the problem and may make a turn so as to intersect the simulated glide path, and the course indicator will then make the trace $a-b$. Arriving within the localizer beam signal zone, the recorder will proceed to trace a path through the inner marker beacon station point 66 and finally makes the procedure turn, as indicated at $c$. The course indicator then proceeds to move outward in the path of the glide path beam, as indicated by $c-d$, passing over the outer marker beacon station point at 70; and a short time thereafter, under the control of the trainer, deviates in heading toward the right a predetermined amount—generally thirty degrees—and then traces a procedure turn at $e$, bringing the course indicator into alignment with the landing runway, as at $f$. The simulated descent of the trainer is then started as soon as the glide path indicator 52 (Fig. 1 or 5) becomes horizontal, the directional alignment with the landing runway being maintained by controlling the trainer to maintain the indicator 34 (Fig. 1) vertically centered, or by means of aural signals as in the device of Fig. 4. During the descent the marker beacon signals 68 and 66 will be flashed in the trainer cockpit in the manner previously described, and the descent is continued until the altimeter reads zero. During the descent the student may call the altitudes in units of a hundred feet or fractions thereof, over the interphone communication system, and the instructor may then mark the altitudes opposite the corresponding position of the marker wheel. When the altimeter in the trainer reads zero, the student may raise the trainer hood—or a signal actuated by the altimeter may be employed—to indicate the completion of the simulated landing, and the point of landing g, is marked by the instructor. From the altitude readings the instructor may easily determine the glide path of the simulated descent, and the point g of the assumed landing on the record sheet indicates whether or not the simulated landing was within the prescribed limits of the landing runway. The altitude should be about eight hundred feet at the outer marker beacon station, and about forty feet at the inner marker beacon point located at the airport boundary when passing thereover during the simulated descent of the trainer.

Figure 6:
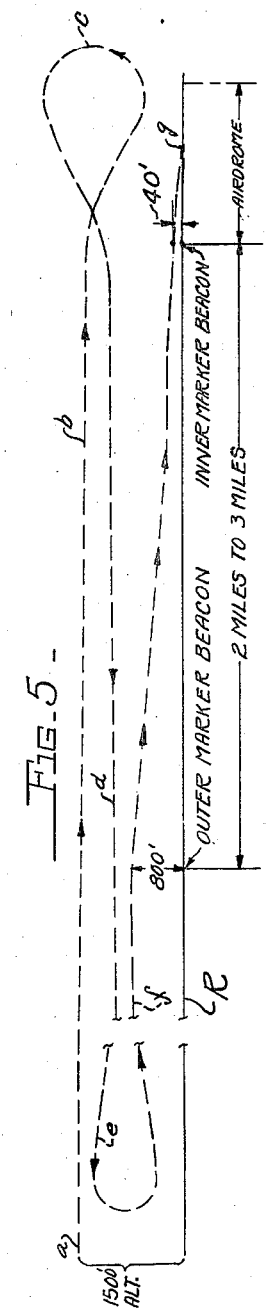
Fig. 6 illustrates a side elevation of the record sheet of Fig. 5 illustrating schematically the simulated flight path of the trainer in making an instrument landing employing the device of Fig. 1 or Fig. 4.

Fig. 6 illustrates schematically the flight maneuvers executed by the trainer during the instrument landing traced in Fig. 5, and the reference indicia correspond to the indicia employed in Fig. 5. The illustration is believed to be sufficiently clear when taken with the description of Fig. 5 so as not to require any further description.

While a simple mechanically operated signalling system for effecting simulated blind instrument landings in an aviation ground trainer has been illustrated, many modifications within the scope of the invention, as defined by the appended claims, will become apparent to those skilled in the art.

I claim:

1. In a system for simulating blind landings in aviation ground training apparatus, a ground trainer for simulating the flight of an aircraft, a reference surface, a course indicator movable relative to said reference surface at a velocity proportional to the simulated flight velocity of said aircraft and directionally controlled by said trainer, a signal system for indicating the position of said course indicator relative to an assumed landing runway on said reference surface including an indicator mounted in the cockpit of said trainer and control means for said signal system, a pivoted arm actuated by said course indicator and having its pivotal axis intersecting said reference surface at a desired point on said landing runway axis, a connection between said arm and said signal system control means, a second signal system for indicating the instant position of said aircraft in said simulated flight relative to a simulated glide path, including a glide path indicator, an altitude-simulating means controlled by said trainer, a means responsive to the simulated rate of descent of said aircraft actuated by said altitude-simulating means for causing said glide path indicator to indicate in one sense of indication, and means controlled by said course indicator in accordance with the simulated velocity of said aircraft for affecting the indication of said glide path indicator in the opposite sense of indication, the net deflection of said glide path indicator representing the relative position of said simulated aircraft descent relative to said simulated glide path.

2. A blind landing indicating system for aviation ground trainers, comprising a signalling system for simulating a landing runway localizer beam indicating device and a control means for said signalling system, a reference surface, a course indicator movably supported on said surface and adapted to have a controlled motion proportional to the simulated velocity in flight of an aircraft and in an equivalent direction thereto, a connection between said course indicator and said signal control means for actuating said signal control means in response to deviation of said course indicator from a predetermined course on said reference surface representing the said landing runway, a second signal system for indicating simulated descent of said aircraft along a predetermined simulated glide path, and a control means for said second signal system actuated by said course indicator in accordance with the velocity thereof and simultaneously operated in accordance with the simulated rate of descent of said aircraft.

3. In a two pointer glide path indicator system for aviation ground trainers, a course indicator for indicating the simulated course of an aircraft, a landing runway localizer beam indicator, a control means for said indicator, a mechanical means connecting said course indicator and said signal control means and responsive to deviation of said course indicator from a predetermined course parallel to a simulated landing runway to cause said indicator to indicate said deviation, a glide path indicator for indicating the simulated path of descent of said aircraft relative to a predetermined simulated glide path including a control means for said glide path indicator, a means responsive to the simulated rate of descent of said aircraft, an operative connection between said glide path indicator control means and said rate of descent responsive means and a connection between said glide path indicator control means and said course indicator for actuating said glide path indicator in accordance with the velocity of said course indicator.

CARL W. MULLER.

REFERENCES CITED

The following references are of record in the file of this patent:

UNITED STATES PATENTS

| Number | Name | Date |
|--------|------|------|
| 2,070,178 | Pottenger | Feb. 9, 1937 |
| 2,110,869 | Crane | Mar. 15, 1938 |

OTHER REFERENCES

Air Corps News Letter, vol. 21, No. 6, March 15, 1938, pages 7 and 8.